B. C. BALL.
METHOD OF FORMING TIRE RIMS.
APPLICATION FILED JULY 7, 1910.
999,085.
Patented July 25, 1911.
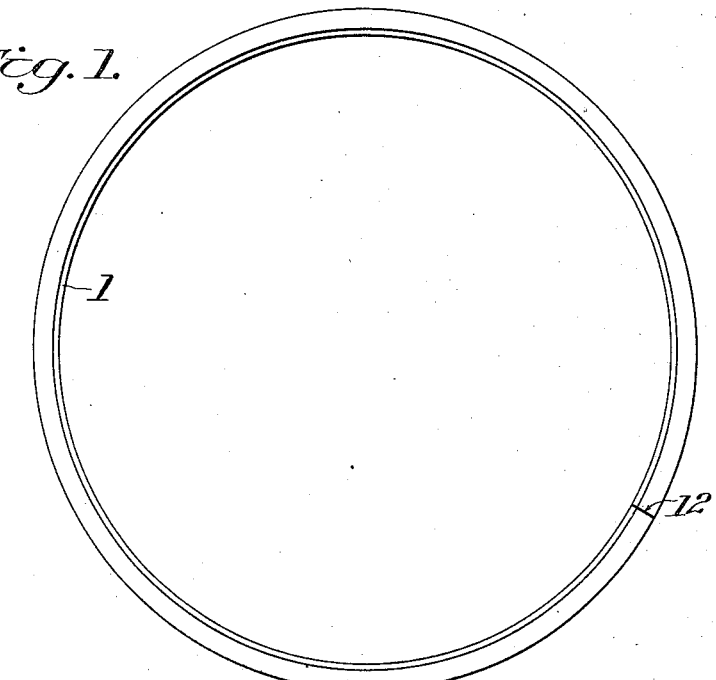
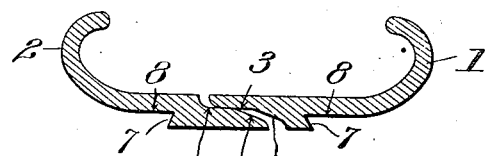
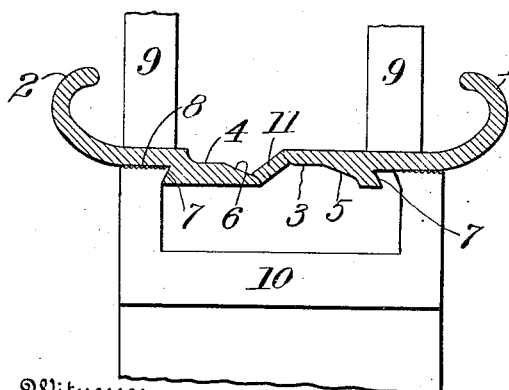
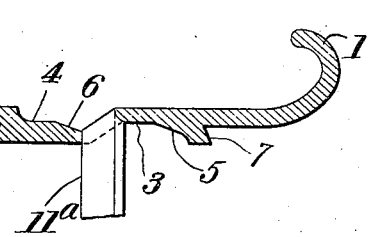
Witnesses
A. M. Parking
M. B. Morris
Inventor
Bert C. Ball
by H. C. Lord
Attorney

UNITED STATES PATENT OFFICE.

BERT C. BALL, OF PORTLAND, OREGON.

METHOD OF FORMING TIRE-RIMS.

999,085.　　　　Specification of Letters Patent.　　Patented July 25, 1911.

Application filed July 7, 1910. Serial No. 570,860.

*To all whom it may concern:*

Be it known that I, BERT C. BALL, a citizen of the United States, residing at Portland, in the county of Multnomah and State of Oregon, have invented new and useful Improvements in the Method or Process of Forming Tire-Rims, of which the following is a specification.

This invention relates to a method or process of forming tire rims, and consists in certain improvements therein as will be hereinafter fully described and pointed out in the claims.

More particularly the invention relates to a process of forming tire rims which are separated circumferentially and have overlapping edges and ordinarily locking shoulders and supporting surfaces formed thereon.

The method may be better understood by means of the drawings, in which—

Figure 1 shows a side elevation of a completed rim. Fig. 2 a transverse section through the rim. Fig. 3 a transverse section through the ring from which the rim is formed showing the method of machining the rim. Fig. 4 a transverse section of the ring from which the rim is formed showing the method of severing the parts.

1 and 2 mark the rim parts. These have any desired form at the edges; ordinarily of the "clencher" type, as shown. The rim part 1 has an overlapping surface 3 on its inner periphery which is shaped and adapted to overlap and fit on the surface 4 on the outer periphery of the rim part 2 when the parts are assembled as shown in Fig. 2. Part 2 has a tapered edge 6 which, when the rim parts are in place, engages the tapered surface 5 on the rim part 1.

In forming the rim parts a bar of metal is rolled as indicated in cross section in Fig. 3 except that the metal forming the tire shoulders is practically flat. It will be noted in this cross section that the two rim parts are united by a piece 11. The bars having the cross section just described are bent into rings and the ends united by brazing or electric welding or any of the usual processes. After this, the edges are bent up forming the tire shoulders. The part 11 is then cut out as by the tool 11ª in Fig. 4, thus severing the rim parts 1 and 2. These parts may then be telescopically placed together as here indicated in Fig. 2. By thus forming the rim parts originally in a united ring, the surfaces 3 and 4 may be rolled or formed prior to uniting the ends and at the same time an exact fit of these surfaces is assured in the completed rim parts. It will be observed that as to the surfaces 3 and 4 it is not of great importance that they be of any exact diameter, but it is of great importance that they have the same diameter or approximately the same diameter so that one will make a nice sliding fit on the other. This method of manufacture assures this in a very economical way.

I prefer to make the rim parts with the locking shoulders 7, preferably undercut as shown, and with the supporting surfaces 8. Inasmuch as these shoulders and supporting surfaces fit other parts it is desirable to machine these so that they may be brought to a predetermined diameter and shape. By machining these, however, while the rim parts are joined by the connecting piece 11, the two sides may be more economically brought to the same size and shape. In Fig. 3 of the drawings I have shown the elements of the tools for machining the shoulders and surfaces. The chuck jaws for holding the rim are indicated at 9, and a suitable cutting tool is shown at 10. It will readily be seen that by simply bringing this cutting tool to place and moving it axially these surfaces and shoulders may be machined effectively and economically.

What I claim as new is,—

1. The method or process of forming tire rims separated circumferentially with edges adapted to overlap, which consists in forming a ring having two parallel annular surfaces, one outside and one inside the ring, of a diameter and shape to form the overlapping edges on the two rim parts, and then severing the ring between the surfaces.

2. The method or process of forming tire rims separated circumferentially with edges adapted to overlap, which consists in forming a ring by bending a plate and joining the ends thereof, having two parallel annular surfaces, one outside and one inside the ring of a diameter and shape to form the overlapping edges on the two rim parts, and then severing the ring between the surfaces.

In testimony whereof I have hereunto set my hand in the presence of two subscribing witnesses.

BERT C. BALL.

Witnesses:
H. C. LORD,
A. M. PARKINS.